Patented Mar. 22, 1932

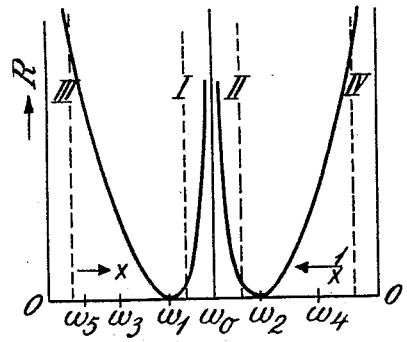
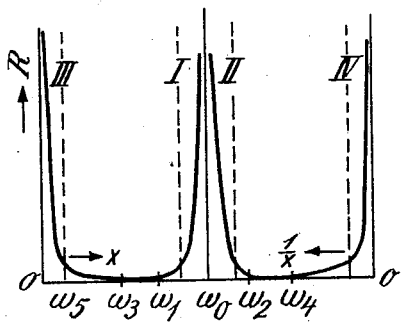
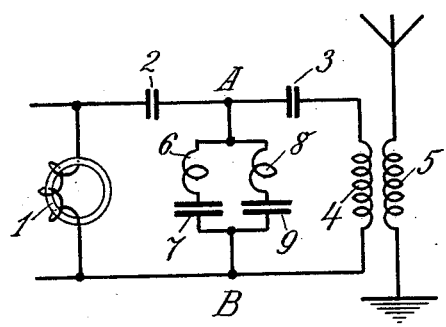

1,850,548

UNITED STATES PATENT OFFICE

ROBERT HERZOG, OF BERLIN, GERMANY, ASSIGNOR TO C. LORENZ AKTIENGESELL-SCHAFT, OF BERLIN-TEMPELHOF, GERMANY

WIRELESS SIGNAL

Application filed January 12, 1929, Serial No. 332,186, and in Germany January 31, 1928.

In the United States application of Felix Gerth and Fritz Gutsmann, Serial No. 156,095, filed December 21, 1926, Pat. No. 1,800,996, a way has been given for removing, in alternating current circuits especially in the oscillation circuits for wireless transmitters, undesired disturbing waves such as, for instance, occur in the form of disturbing side waves with frequency multiplication by means of static frequency transformers.

Figures 1 and 2 are curves explanatory of my invention, and

Figure 3 shows a preferred embodiment of my invention.

Absorption circuits were mentioned there, which have the property of absorbing definite, particularly disturbing frequencies which are often very near the useful wave; for instance when the 9th harmonic of a particular fundamental frequency is to be used as the utility wave, to absorb the 7th and 11th harmonic. They have, on the other hand, in their entirety the character of a rejector circuit, that is to say, a high resistance for the utility wave. In Fig. 1 is shown the curve of the apparent resistance of such an arrangement for all frequencies. For the sake of greater clearness the frequency itself is not represented as the abscissa, but the proportion X of any desired frequency $\omega$ to a particular frequency for instance, to the utilized frequency ($\omega_0$). Frequencies that are less than the normal frequency $\omega_0$ are represented by the value X and frequencies greater than $\omega_0$ are represented by $$\frac{1}{X},$$

so that the axis of the abscissa takes a finite value with the value $\omega_0$, that is $X=1$ in the centre. The apparent resistance R is represented as ordinate, which becomes infinitely great at $\omega_0$, on the other hand, at $\omega_1$ (the lower lying disturbing secondary waves) and at $\omega_2$ (the upper lying disturbing waves) equal to 0. For infinitely great and infinitely small frequencies the resistance R increases again to $\infty$.

This arrangement according to the application Ser. No. 156,095 has, actually, in relation to other well-known filter circuits a particularly good absorbing action in the sense mentioned. Nothing has been said, however, about the best dimensions of the individual circuits, that is to say, the ratio $$\frac{L}{C}$$

or the damping. This is also unnecessary here where it is a matter of not allowing a main wave to go through, and for given secondary waves, to create a short-circuit through an absorption circuit for each. For this reason, self-induction coils and capacities in the same order of magnitude as the remaining circuit elements of the transmitter were hitherto chosen. If still more than two secondary waves were present the same number of absorption circuits had to be provided as the number of disturbing waves.

The present invention has for its object to remove disturbing waves even still further away (for instance $\omega_3$, $\omega_4$ and $\omega_5$, Fig. 1) with only two absorption circuits which are tuned to two specially disturbing secondary waves. This is done not only by satisfying the resonance conditions given in said application Ser. No. 156,095 (for instance, with two disturbing waves three resonance conditions) but also, by giving the resonance curve of the resistance such a form, that also frequencies still further away find a very small resistance, while the three other conditions, the greatest possible resistance for the utility wave, and the smallest possible resistance (short-circuit) for the two most disturbing secondary waves, remain satisfied the same as before. Such a form of the resonance curve can be attained by giving to the capacities extremely large values and the self-induction coils extremely small values, that is to say, by making the ratio $$\frac{L}{C}$$

as small as possible, such as by the use, as shown, of a coil not exceeding a single turn, i. e., a single turn or fraction thereof. A resistance curve according to Fig. 2 is then obtained. Further it is to be observed that the damping of the arrangement is made as little as possible, in order not to remove the advantage of the widened range of small resistance, by flattening the resonance curve at the point $\omega_0$ or by increasing the resistance at $\omega_1$ and $\omega_2$.

For instance, the self-induction coils 6 and 8 consists each of a single turn or even less than a complete turn, of a conductor which, in order to produce the smallest damping possible, comprises a plurality of strands of high frequency wire, of large cross-section, connected in parallel. To satisfy the resonance conditions, the condensers must be of correspondingly high values, for instance 3 to 4 mfs. with a utilized wave of $\lambda = 500$ m., it being likewise important that the condensers should have the smallest possible resistance losses.

As can be seen from the curve in Fig. 2 the oscillation resistance R is likewise small for frequencies, which lie rather far above and below the utilized frequency while the value of R at $\omega_0$ increases very quickly to a high value. Therefore the entire frequency band is almost completely suppressed, on one side between the perpendiculars I and III and on the other side between II and IV, and it must also be taken into consideration that normally the amplitudes of the disturbing frequencies constantly decrease with the distance from $\omega_0$.

Further it is advantageous to connect the absorption circuit arrangement to such places of the utility oscillation circuit, where, for the utility wave the smallest differences of potential prevail. Fig. 3 shows this form of circuit. In this circuit 1 is a frequency transformer which besides the utilized wave comprises a whole spectrum of secondary waves, two of which are usually particularly strongly pronounced and lie rather near the utilized wave. The circuit 1 2 3 4 is tuned to the utilized wave. If the capacities 2 and 3 are correctly chosen in relation to the self induction coils 1 and 4, then on the points A and B, there prevails for the utilized wave, a potential node, that is to say, these are two points of the smallest difference of potential for the utility wave while for all other frequencies a more or less great capacitive or inductive potential is present. The combination of filter and rejector circuit 6, 7, 8, 9 is connected to these points A and B. The resistance of this combination is very high for the utility wave, for both the adjacent side waves practically 0, and is for those waves still further away, which get weaker and weaker, the farther they are from the utilized frequency, still very low so that in the circuit 6, 7, a current flows of the frequency of the utilized wave and practically free from harmonics.

I claim:

1. In a wireless signalling system, the combination of a circuit containing capacity and inductance tuned to a signalling frequency, a circuit arrangement bridged across said tuned circuit and having two parallel connected paths each containing serially related capacity and inductance, one path being tuned to a frequency below and the other to a frequency above the signalling frequency, and the capacities and inductances of said paths being so related that said circuit arrangement offers very low, approximately uniform, impedance to bands of frequencies both above and below the signalling frequency, and very high impedance to the signalling frequency.

2. In a wireless signalling system, the combination of two connected circuits, each containing capacity and inductance and tuned to a signalling frequency, a circuit interposed between said first mentioned circuits and having two parallel connected paths each containing serially related capacity and inductance, one path being tuned to a frequency below and the other to a frequency above the signalling frequency, and the capacities and inductances of said paths being so related that said interposed circuit offers very low, approximately uniform, impedance to a band of frequencies above and to a band of frequences below the signalling frequency, and very high impedance to the signalling frequency.

In testimony whereof I have affixed my signature.

ROBERT HERZOG.